United States Patent
Rosén et al.

(10) Patent No.: US 12,152,791 B2
(45) Date of Patent: Nov. 26, 2024

(54) EFFICIENCY FOR A HEAT EXTRACTING SYSTEM AND/OR A HEAT DEPOSITING SYSTEM

(71) Applicant: E.ON SVERIGE AB, Malmo (SE)

(72) Inventors: Per Rosén, Lund (SE); Jacob Skogström, Lomma (SE); Bengt Lindoff, Bjarred (SE); Helen Carlstrom, Bjarred (SE); Fredrik Rosenqvist, Helsingborg (SE)

(73) Assignee: E.ON SVERIGE AB, Malmo (SE)

( * ) Notice: Subject to any disclaimer, the term of this patent is extended or adjusted under 35 U.S.C. 154(b) by 81 days.

(21) Appl. No.: 17/905,809

(22) PCT Filed: Mar. 10, 2021

(86) PCT No.: PCT/EP2021/055968
§ 371 (c)(1),
(2) Date: Sep. 7, 2022

(87) PCT Pub. No.: WO2021/180752
PCT Pub. Date: Sep. 16, 2021

(65) Prior Publication Data
US 2023/0118895 A1    Apr. 20, 2023

(30) Foreign Application Priority Data
Mar. 12, 2020 (EP) .................... 20162691

(51) Int. Cl.
*F24D 19/10*  (2006.01)
*F24D 3/18*  (2006.01)
(Continued)

(52) U.S. Cl.
CPC ........... *F24D 19/1072* (2013.01); *F24D 3/18* (2013.01); *F24D 10/00* (2013.01); *F24F 5/0003* (2013.01)

(58) Field of Classification Search
CPC ........ F24D 10/00; F24D 3/18; F24D 19/1072; F24D 2200/12; F24D 2200/13;
(Continued)

(56) References Cited

U.S. PATENT DOCUMENTS

2012/0279681 A1    11/2012  Vaughan et al.
2016/0334116 A1*   11/2016  Zaynulin ............. F24D 19/1015
(Continued)

FOREIGN PATENT DOCUMENTS

CN          107003012 A       8/2017
EP          3569935           11/2019
(Continued)

OTHER PUBLICATIONS

International Search Report and Written Opinion of PCT/EP2021/055968, dated Apr. 19, 2021.

*Primary Examiner* — Frantz F Jules
*Assistant Examiner* — Martha Tadesse
(74) *Attorney, Agent, or Firm* — Knobbe, Martens, Olson & Bear, LLP

(57) ABSTRACT

A heat extracting system (100) arranged to be connected to a thermal energy circuit (300) comprising a hot conduit (302) configured to allow thermal fluid of a first temperature to flow therethrough, and a cold conduit (304) configured to allow thermal fluid of a second temperature to flow therethrough, the second temperature is lower than the first temperature, and a heat depositing system (200) arranged to be connected to a thermal energy circuit (300) comprising a hot conduit (302) configured to allow thermal fluid of a first temperature to flow therethrough, and a cold conduit (304) configured to allow thermal fluid of a second temperature to flow therethrough, the second temperature is lower than the first temperature. Also a heat depositing system (200) is disclosed.

13 Claims, 5 Drawing Sheets

(51) Int. Cl.
  *F24D 10/00* (2022.01)
  *F24F 5/00* (2006.01)
(58) Field of Classification Search
  CPC ....... F24F 5/0003; F24F 5/0096; Y02B 30/52;
      Y02B 30/17; Y02E 20/14
  See application file for complete search history.

(56) References Cited

U.S. PATENT DOCUMENTS

2018/0259196 A1   9/2018  Rosen
2020/0049381 A1*  2/2020  Thielmann .............. F24T 10/40

FOREIGN PATENT DOCUMENTS

EP       3591298          1/2020
JP       2000146356 A  *  5/2000   ......... F28D 20/0052
WO    WO 2010/145040    12/2010

* cited by examiner

EFFICIENCY FOR A HEAT EXTRACTING SYSTEM AND/OR A HEAT DEPOSITING SYSTEM

FIELD OF THE INVENTION

The present invention relates to distribution of heating and/or cooling by means of a thermal energy circuit comprising thermal fluid from a thermal plant to thermal devices. More specifically, the present invention relates to a heat extracting system and to a heat depositing system.

BACKGROUND ART

District heating is a technique commonly used today to provide heating to buildings connected to the grid. In some prior art district heating systems, heat exchangers are installed to extract the heat from the district heating circuit and to distribute the heat to for instance comfort heating and/or tap hot water in the respective building. Typically, a district heating plant provides the heat necessary for the district heating system. Such systems generally require relatively high temperatures of the outgoing thermal fluid to be able to provide the desired heating. Lately, low temperature heating grids have been applied instead where heat pumps and/or cooling machines are used instead of heat exchangers. Such systems do not need as high of a temperature of the thermal fluid, as for instance a heat pump is more efficient at extracting heat than a passive heat exchanger. This provides certain benefits in terms of facilitating installation of the system, enabling heat/cooling sharing between the buildings connected to the system as well as an overall efficiency increase and lower heat losses to the ground due to the lower temperatures.

However, heat pump/cooling machine-based systems requires controlling to ensure that each individual heat pump/cooling machine is able to meet the thermal loads it is being subjected to. The district heating system as a whole further needs to be controlled to meet the aggregated thermal loads of all connected heat pumps/cooling machines. This problem is especially complex in systems where a number of heat pumps/cooling machines are connected to a common thermal energy distribution system. It is desired to improve on prior art solutions and to provide a system which facilitates control of heat distribution and/or cooling distribution. Related background art can be found e.g. in WO 2010/145040 A1, US 2020/049381 A1, EP 3591298 A1 and in EP 3569935 A1.

SUMMARY OF THE INVENTION

In view of that stated above, the object of the present invention is to provide a heat extracting system and/or a heat depositing system which alleviates some of the problems with prior art solutions.

More specifically, there is provided according to a first aspect a heat extracting system arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature. The heat extracting system comprising:

a thermal heating circuit comprising a thermal heating circuit inlet connectable to the hot conduit and a thermal heating circuit outlet connectable to the cold conduit. The thermal heating circuit is configured to transfer thermal fluid from the thermal heating circuit inlet to the thermal heating circuit outlet. The thermal heating circuit further comprises a thermal heating circuit flow regulator configured to regulate the flow of the thermal fluid from the thermal heating circuit inlet to the thermal circuit outlet based on one or more of a desired temperature of thermal fluid in the thermal heating circuit outlet, a desired pressure difference of thermal fluid in the thermal heating circuit inlet and the thermal heating circuit outlet and a desired temperature difference of thermal fluid in the thermal heating circuit inlet and the thermal heating circuit outlet. The heat extracting system further comprises a plurality of heat pump assemblies each comprising a heat pump, a heat pump circuit and a heat pump assembly controller. The heat pump being connected to the heat pump circuit, the heat pump circuit comprising a heat pump circuit inlet connected to the thermal heating circuit at a first connection point, a heat pump circuit outlet connected to the thermal heating circuit at a second connection point and a heat pump control pump configured to control a flow of thermal fluid from the heat pump circuit inlet through the heat pump at a heat extraction side thereof to the heat pump circuit outlet. The heat pump assembly controller is configured to control the heat pump control pump based on a heat pump demand signal.

The heat extracting system may thus able to provide a flow rate of thermal fluid that can be tailored for each heat pump assembly. More specifically, each heat pump of each heat pump assembly can thus be provided with its desired flow rate of thermal fluid by the heat pump control pump in response to the heat pump demand signal. This facilitates that the heat pump of each heat pump assembly performs with improved efficiency. It may further reduce losses in the system as no control valves are needed for controlling the flow in each heat pump assembly. The heat pump control pumps may further provide redundancy to the system as they provide additional circulation in the heat extracting system as a whole, relieving some of the circulation demands from the heating circuit regulator, the capacity of which can be reduced and the control thereof be simplified as each heat pump assembly on its own regulates the flow of thermal fluid to suit the respective heat pump.

The plurality of heat pump assemblies may be connected to the heat pump circuit such that the first connection point of each respective heat pump assembly is arranged one after the other in a downstream direction on the heat pump circuit.

Further still, the plurality of heat pump assemblies may be connected to the heat pump circuit such that the second connection point of each respective heat pump assembly is arranged one after the other in a downstream direction on the heat pump circuit.

The first connection point of a subsequent heat pump assembly may be connected to the heat pump circuit downstream of the second connection point of a preceding heat pump assembly. Only one heating circuit conduit may thus be needed, this may reduce the complexity of the system and facilitating installation thereof. The heat pump control pump allows adaptation of the effects on the temperature of the thermal fluid that the successive arrangement of the heat pump assemblies on the heating circuit may have.

Moreover, for at least one of the plurality of heat pump assemblies, the heat pump circuit and the thermal heating circuit may partially overlap. The overlap being between the first and second connection points. Having an overlap allows each heat pump assembly with an overlap to circulate thermal fluid independently of the circulation rate in the heating circuit, i.e. at a higher or lower rate, depending on the thermal demands placed on the heat pump in said assembly. This may allow improved flexibility to the heat extracting system.

Further still, at least one of the plurality of heat pumps may be configured to provide tap hot water. The heat pump demand signal for such a heat pump being a demand signal for tap hot water.

At least one of the plurality of heat pumps may be configured to provide comfort heating. The heat pump demand signal for such a heat pump being a demand signal for comfort heating.

According to a second aspect of the present disclosure, a heat depositing system is provided. The heat depositing system being arranged to be connected to a thermal energy circuit comprising a hot conduit configured to allow thermal fluid of a first temperature to flow therethrough, and a cold conduit configured to allow thermal fluid of a second temperature to flow therethrough, the second temperature being lower than the first temperature. The heat depositing system comprising:

a thermal cooling circuit comprising a thermal cooling circuit inlet connectable to the cold conduit and a thermal cooling circuit outlet connectable to the hot conduit, the thermal cooling circuit is configured to transfer thermal fluid from the thermal cooling circuit inlet to the thermal cooling circuit outlet. The thermal cooling circuit further comprises a thermal cooling circuit flow regulator configured to regulate the flow of the thermal fluid from the thermal cooling circuit inlet to the thermal circuit outlet based on one or more of a desired temperature of thermal fluid in the thermal cooling circuit outlet, a desired pressure difference of thermal fluid in the thermal cooling circuit inlet and the thermal cooling circuit outlet and a desired temperature difference of thermal fluid in the thermal cooling circuit inlet and the thermal cooling circuit outlet. The heat depositing system further comprises a plurality of cooling machine assemblies each comprising a cooling machine, a cooling machine circuit and a cooling machine assembly controller. The cooling machine being connected to the cooling machine circuit, the cooling machine circuit comprising a cooling machine circuit inlet connected to the thermal cooling circuit at a first connection point, a cooling machine circuit outlet connected to the thermal cooling circuit at a second connection point and a cooling machine control pump configured to control a flow of thermal fluid from the cooling machine circuit inlet through the cooling machine at a heat depositing side thereof to the cooling machine circuit outlet. The cooling machine assembly controller is configured to control the cooling machine control pump based on a cooling machine demand signal.

The heat depositing system may thus able to provide a flow rate of thermal fluid that can be tailored for each cooling assembly. More specifically, each cooling machine of each cooling machine assembly can thus be provided with its desired flow rate of thermal fluid by the cooling machine control pump in response to the cooling machine demand signal. This facilitates that the cooling machine of each cooling machine assembly performs with improved efficiency. It may further reduce losses in the system as no control valves are needed for controlling the flow in each cooling machine assembly. The cooling machine control pumps may further provide redundancy to the system as they provide additional circulation in the heat depositing system as a whole, relieving some of the circulation demands from the cooling circuit regulator, the capacity of which can be reduced and the control thereof be simplified as each cooling machine assembly on its own regulates the flow of thermal fluid to suit the respective cooling machine.

The plurality of cooling machine assemblies may further be connected to the cooling machine circuit such that the first connection point of each respective heat pump assembly is arranged one after the other in a downstream direction on the heat pump circuit.

Further still, the plurality of cooling machine assemblies may be connected to the heat pump circuit such that the second connection point of each respective cooling machine assembly is arranged one after the other in a downstream direction on the cooling machine circuit.

The first connection point of a subsequent cooling machine assembly may be connected to the cooling machine circuit downstream of the second connection point of a preceding cooling machine assembly. Only one cooling circuit conduit may thus be needed, this may reduce the complexity of the system and facilitating installation thereof. The cooling machine control pump allows adaptation of the effects on the temperature of the thermal fluid that the successive arrangement of the cooling machine assemblies on the cooling circuit may have.

In one embodiment, for at least one of the plurality of cooling machine assemblies, the cooling machine circuit and the thermal cooling circuit may partially overlap, wherein the overlap is between the first and second connection points. Having an overlap allows each cooling machine assembly with an overlap to circulate thermal fluid independently of the circulation rate in the cooling circuit, i.e. at a higher or lower rate, depending on the thermal demands placed on the cooling machine in said assembly. This may allow improved flexibility to the heat depositing system.

At least one of the plurality of cooling machines may be configured to provide comfort cooling. The cooling machine demand signal for such a cooling machine being a demand signal for comfort cooling.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Heat pumps and cooling machines are machines that are used to provided heating or cooling, respectively, to various types of buildings and could be arranged to provided heat and/or cooling for instance comfort heating/cooling purposes and for tap hot water.

Figure 1:
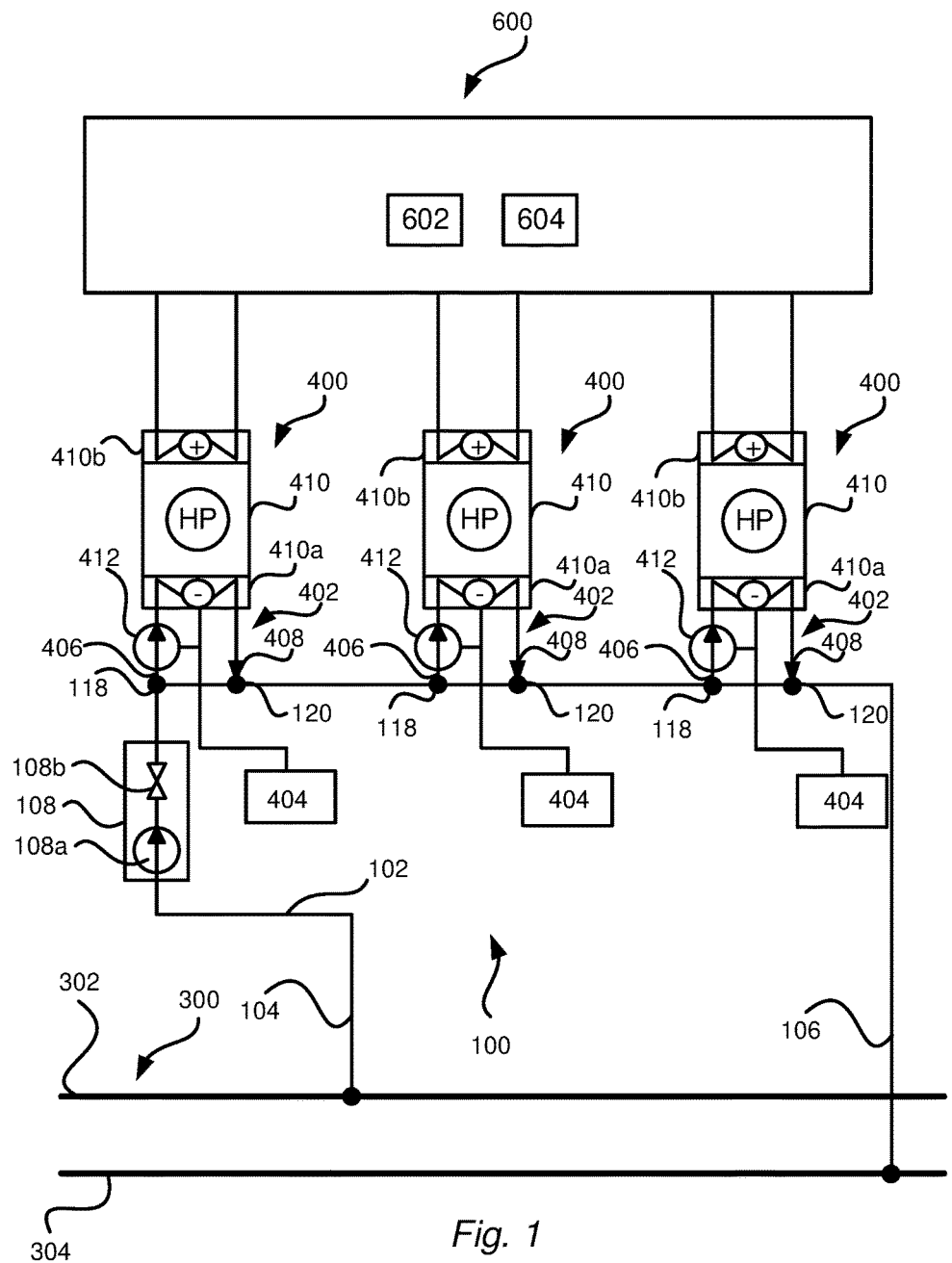
FIG. 1 discloses a schematic flow chart of a heat extracting system according to the present invention.

Referring firstly to FIG. 1, in which a heat extracting system 100 is shown. The heat extracting system 100 is configured to extract heat from a thermal energy circuit 300 to which it is connected and deliver it to a building 600 by means of a plurality of heat pump assemblies 400. The building 600 may be any type of building suitable for connection to the thermal energy circuit 300, such as a residential building, commercial or office building, an apartment building, a free-standing house or an industrial building.

The thermal energy circuit 300 may be a district heating grid or a district cooling grid known in the art. The district heating grid (or a district cooling grid) may comprise a supply conduit providing heating (or cooling) medium from a thermal plant (not shown) and a return conduit which transport cooled heating medium (or heated cooling medium) to the thermal plant. The heating (or cooling) medium may be any fluid suitable for heating (or cooling) at the thermal plant and transported by means of the supply conduit and the return conduit, such as water. The heating (or cooling) medium will henceforth be referred to as "thermal fluid". The thermal plant may be a geothermal plant, an electrically powered plant for heating (or cooling) fluids, or may be driven by combustion of fuels, such as gas or oil. The thermal plant is configured to heat (or cool) the heating (or cooling) medium and pump it through the thermal energy circuit 300. For a district heating grid, the supply conduit is considered as a hot conduit 302 and the return conduit is considered as a cold conduit 304. For a district cooling grid, the supply conduit is considered as a cold conduit 304 and the return conduit is considered as a hot conduit 302.

As an alternative to being a district heating or district cooling grid, the thermal energy circuit 300 may be a combined district heating and cooling grid as previously disclosed in, e.g., WO 2017/076868 filed by E.ON Sverige AB. In such case, the hot and cold conduits 302 and 304 are not to be seen as supply and return conduits but instead to be seen as the hot conduit and the cold conduit 304 as disclosed in WO 2017/076868.

Hence, the thermal energy circuit 300 comprises a hot conduit 302 and a cold conduit 304 for distributing thermal energy to/from a thermal heating circuit 102 and/or to/from a thermal cooling circuit 202.

The hot conduit 302 is configured to allow thermal fluid of a first temperature to flow therethrough and the cold conduit 304 is configured to allow thermal fluid of a second temperature to flow therethrough, the second temperature is lower than the first temperature.

The heat extracting system 100 further comprises a thermal heating circuit 102 comprising a thermal heating circuit inlet 104 connectable to the hot conduit 302 and a thermal heating circuit outlet 106 connectable to the cold conduit 304. The thermal heating circuit 100 forms a secondary circuit which is connectable to the thermal energy circuit 300.

The thermal heating circuit 102 is configured to transfer thermal fluid from the thermal heating circuit inlet 104 to the thermal heating circuit outlet 106. The thermal heating circuit 102 comprises a thermal heating circuit flow regulator 108 configured to regulate the flow of the thermal fluid from the thermal heating circuit inlet 104 to the thermal circuit outlet 106 based on one or more of a desired temperature of thermal fluid in the thermal heating circuit outlet 106, a desired pressure difference of thermal fluid in the thermal heating circuit inlet 104 and the thermal heating circuit outlet 106 and a desired temperature difference of thermal fluid in the thermal heating circuit inlet 104 and the thermal heating circuit outlet 106.

The thermal heating circuit flow regulator 108 may comprise a thermal heating circuit circulation pump 108a. The thermal heating circuit circulation pump 108a may be any type of pump suitable for circulation of fluids. The thermal heating circuit flow regulator 108 may further comprise a thermal heating circuit control valve 108b. In one embodiment, the thermal heating circuit circulation pump 108a and the thermal heating circuit control valve 108b of the heating circuit flow regulator 108 are combined as a pump/valve-assembly.

The plurality of heat pump assemblies 400 each comprises a heat pump 410. Each heat pump 410 comprises an internal thermal fluid being circulated between a heat extracting side 410a of the heat pump 410 having a vaporizer and a heat depositing side 410b having a condenser. The heat extracting side 410a extracts heat from the thermal fluid supplied to the respective heat pump 410 via a respective heat pump circuit 402. The thermal fluid in the heat pump circuit 402 is fluidly separated from the internal thermal fluid of each heat pump 410. The construction and function of a heat pump 410 is considered to be known by a person skilled in the art, the heat pump 410 will thus not be further described herein.

Each heat pump circuit 402 comprises a heat pump circuit inlet 406 connected to the thermal heating circuit 102 at a first connection point 118 and a heat pump circuit outlet 408 connected to the thermal heating circuit 102 at a second connection point 120.

Each heat pump circuit 402 further comprises a heat pump control pump 412 configured to control a flow of thermal fluid from the heat pump circuit inlet 406 through the heat pump 410 at the heat extraction side 410a thereof to the heat pump circuit outlet 408. The heat pump control pump 412 facilitates controlling the amount of thermal fluid that is provided to each individual heat pump 410. Each heat pump 410 may thus be provided with the amount of thermal fluid that the respective heat pump 410 requires to meet the thermal loads 602, 604 placed on the heat pump 410. The thermal loads may be either comfort heating 602 and/or tap hot water 604 for the building 600 that the respective heat pump 410 is connected to. The heat pump control pump 412 is preferably a variable-speed controllable pump that allows accurate control of the flow rate of the thermal fluid provided by the respective heat pump control pump 412.

A heat pump assembly controller 404 is also provided, which is connected to each heat pump control pump 412 and configured to control the heat pump control pump 412 based on a heat pump demand signal. The heat pump demand signal indicates a thermal load 602, 604 placed on the respective heat pump 410 and/or a parameter indicative of the efficiency of the associated heat pump 410. In one embodiment, the parameter may be the heat pump power consumption, which the heat pump control pump 412 may be controlled by the heat pump controller 404 to reduce. For instance, for a given thermal load placed on the heat pump 410 and a given temperature of the thermal fluid in the heat pump circuit inlet 406, the heat pump control pump 412 is controlled such that the flow rate to the heat pump 410 is such that the heat pump 410 can meet the thermal loads 602, 604 while using as little electrical power as possible. Each heat pump controller 404 may thus be connected to the respective heat pump 410 as well, as is indicated in FIG. 1.

Further, in FIG. 1, one heat pump controller 404 is shown for each heat pump assembly 400. However, the heat pump controllers 404 may be formed by a single unit being configured to control the entire heat extracting system 100. The respective heat pump controller 404 may thus be connected to the heating circuit regulator 108 as well.

Figure 2:
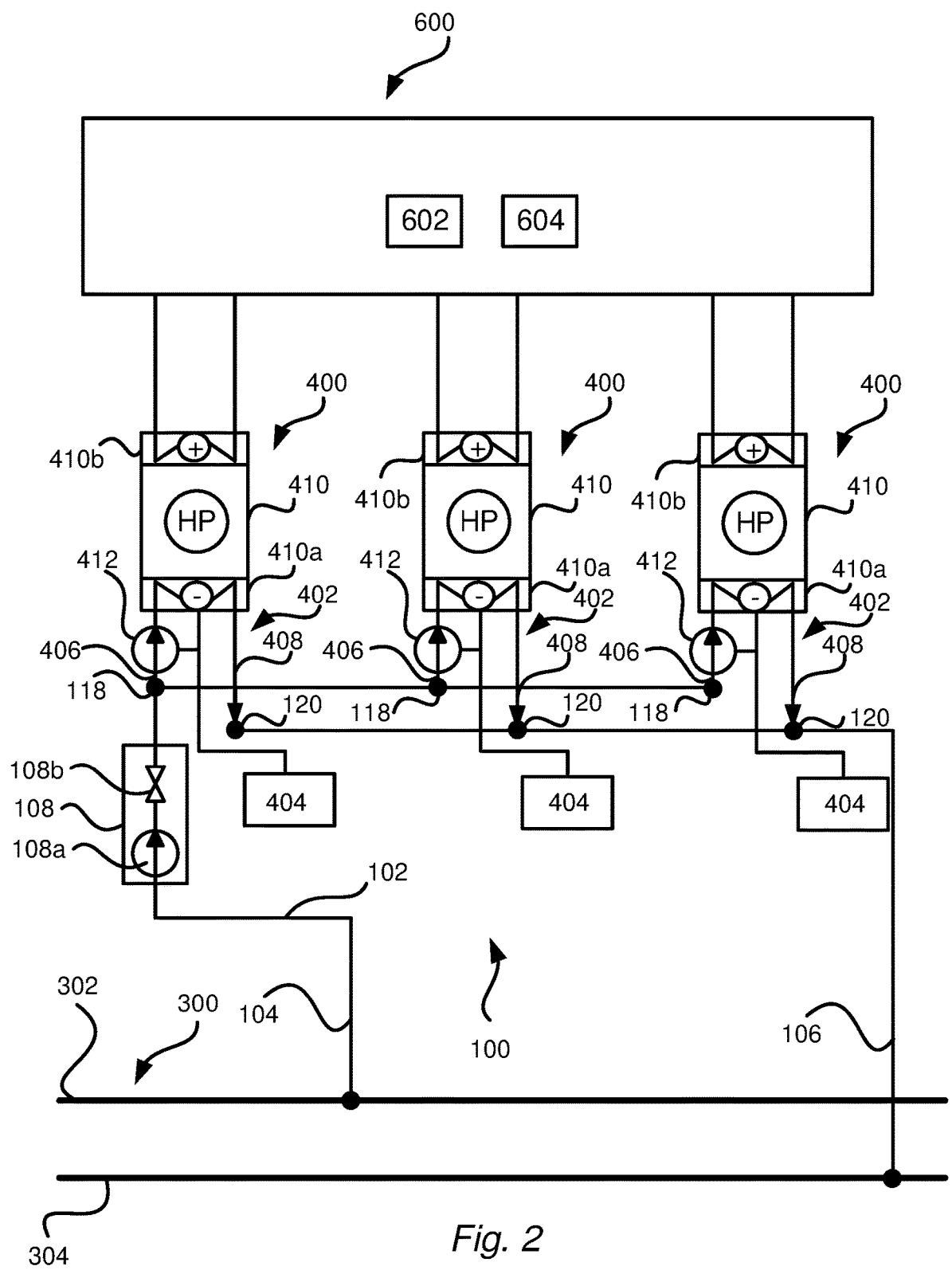
FIG. 2 discloses a schematic flow chart of a heat extracting system according to the present invention.

The plurality of heat pump assemblies 400 may be connected to the heat pump circuit 102 such that the first connection point 118 of each respective heat pump assembly 400 is arranged one after the other in a downstream direction on the heat pump circuit 102. Further still, the plurality of heat pump assemblies 400 may be connected to the heat pump circuit 102 such that the second connection point 120 of each respective heat pump assembly 400 is arranged one after the other in a downstream direction on the heat pump circuit 102. The first and second connection points 118, 120 do not necessarily have to connect to the same conduit on the heating circuit 102, as is illustrated in the embodiment in FIG. 2. The embodiment of the heat extraction system 100 in FIG. 2 is identical to that of FIG. 1 apart from that the first connection points 118 and the second connection points 120 are connected to separated conduits on the heating circuit 102. Having the first connection points 118 arranged on one conduit and the second connection points 120 on another conduit facilitates providing each heat pump assembly 400 with thermal fluid having more or less the exact same temperature. This may facilitate control of the respective heat pump assemblies 400 with a downside of having to use a separate conduit for the provision of thermal fluid and a separate conduit for the return of thermal fluid, which adds to the complexity of the heat extracting system 100.

The preferred embodiment shown in FIG. 1 shows how the first connection point 118 of a subsequent heat pump assembly 400 may be connected to the heat pump circuit 102 downstream of the second connection point 120 of a preceding heat pump assembly 400. This arrangement is facilitated by the individual control of each heat pump control pump 412 which allows adaptation of the eventual effect the aforementioned arrangement may have on the temperature of the thermal fluid as it passes each heat pump assembly 400. Further still, as shown in FIG. 1, each heat pump circuit 402 and the thermal heating circuit 102 may partially overlap. The overlap is between the first 118 and second 120 connection points. Each heat pump assembly 400 may thus circulate thermal fluid at a rate that is above or below that of the thermal heating circuit 102.

The heat pump control pump 412 provided in each heat pump assembly 412 further allows omission of valves that are typically used to control the flow of thermal fluid in prior art systems. Such prior art systems generally suffers from relatively high losses due to the restriction formed by each of the valves as they control the flow. This can be avoided by the provision of individual heat pump control pumps 412. Moreover, the heat pump control pumps 412 are capable of providing circulation of thermal fluid even if the heating circuit regulator 108 for some reason fails, even in the thermal heating circuit 102 to some degree. This provides a degree of redundancy and an increase in the robustness of the heat extraction system 100 of the present disclosure.

Figure 3:
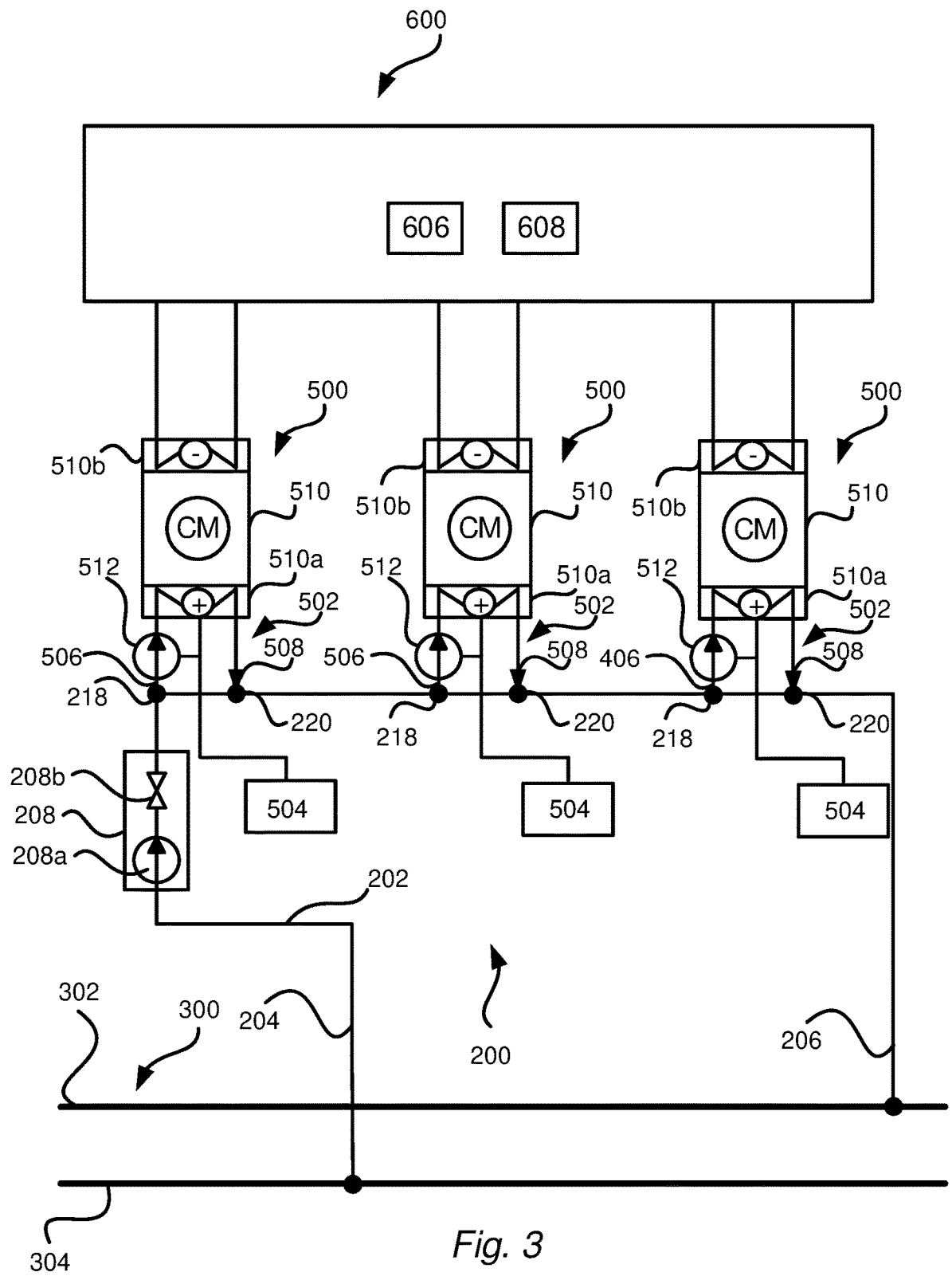
FIG. 3 discloses a schematic flow chart of a heat depositing system according to the present invention.

Turning now to FIG. 3 which shows a heat depositing system 200. The heat depositing system is configured to deposit heat to a thermal energy circuit 300 to which it is connected. The heat is extracted from a building 600 by means of a plurality of cooling machine assemblies 500. The building 600 may be any type of building suitable for connection to the thermal energy circuit 300, such as a residential building, commercial or office building, an apartment building, a free-standing house or an industrial building. The thermal energy circuit 300 has been described in conjunction with the description of FIG. 1 and will thus not be described again.

The heat depositing system 200 further comprises a thermal cooling circuit 202 comprising a thermal cooling circuit inlet 204 connectable to the cold conduit 304 and a thermal cooling circuit outlet 206 connectable to the hot conduit 302. The thermal cooling circuit 200 forms a secondary circuit which is connectable to the thermal energy circuit 300.

The thermal cooling circuit 202 is configured to transfer thermal fluid from the thermal cooling circuit inlet 204 to the thermal cooling circuit outlet 206. The thermal cooling circuit 202 comprises a thermal cooling circuit flow regulator 208 configured to regulate the flow of the thermal fluid from the thermal cooling circuit inlet 204 to the thermal circuit outlet 206 based on one or more of a desired temperature of thermal fluid in the thermal cooling circuit outlet 206, a desired pressure difference of thermal fluid in the thermal cooling circuit inlet 204 and the thermal cooling circuit outlet 206 and a desired temperature difference of thermal fluid in the thermal cooling circuit inlet 204 and the thermal cooling circuit outlet 206.

The thermal cooling circuit flow regulator 208 may comprise a thermal cooling circuit circulation pump 208a. The thermal cooling circuit circulation pump 208a may be any type of pump suitable for circulation of fluids. The thermal cooling circuit flow regulator 208 may further comprise a thermal cooling circuit control valve 208b. In one embodiment, the thermal cooling circuit circulation pump 208a and the thermal cooling circuit control valve 208b of the cooling circuit flow regulator 208 are combined as a pump/valve-assembly.

The plurality of cooling machine assemblies 500 each comprises a cooling machine 510. Each cooling machine 510 comprises an internal thermal fluid being circulated between a heat depositing side 510a of the cooling machine 510 having a condenser and a heat extracting side 510b having an evaporator. The heat depositing side 510a deposits heat to the thermal fluid supplied to the respective cooling machine 510 via a respective cooling machine circuit 502. The thermal fluid in the cooling machine circuit 502 is fluidly separated from the internal thermal fluid of each cooling machine 510.

Each cooling machine circuit 502 comprises a cooling machine circuit inlet 506 connected to the thermal cooling circuit 202 at a first connection point 218 and a cooling machine circuit outlet 508 connected to the thermal cooling circuit 202 at a second connection point 220.

Each cooling machine circuit 502 further comprises a cooling machine control pump 512 configured to control a flow of thermal fluid from the cooling machine circuit inlet 506 through the cooling machine 510 at the heat depositing side 510a thereof to the cooling machine circuit outlet 508. The cooling machine control pump 512 facilitates controlling the amount of thermal fluid that is provided to each individual cooling machine 510. Each cooling machine 510 may thus be provided with the amount of thermal fluid that the respective cooling machine 510 requires to meet the thermal loads 606, 608 placed on the cooling machine 510. The thermal loads may be e.g. comfort cooling 606 and/or other cooling needs 608 such as added cooling to rooms containing heat generating equipment etc., for the building 600 that the respective cooling machine 510 is connected to. The cooling machine control pump 512 is preferably a variable-speed controllable pump that allows accurate control of the flow rate of the thermal fluid provided by the respective cooling machine control pump 512.

A cooling machine assembly controller 504 is also provided, which is connected to each cooling machine control pump 512 and configured to control the cooling machine control pump 512 based on a cooling machine demand signal. The cooling machine demand signal indicates a thermal load 602, 604 placed on the respective cooling machine 510 and/or a parameter indicative of the efficiency of the associated cooling machine 510. In one embodiment, the parameter may be the cooling machine power consumption, which the cooling machine control pump 512 may be controlled by the cooling machine controller 504 to reduce. For instance, for a given thermal load placed on the cooling machine 510 and a given temperature of the thermal fluid in the cooling machine circuit inlet 506, the cooling machine control pump 512 is controlled such that the flow rate to the cooling machine 510 is such that the cooling machine 510 can meet the thermal loads 606, 608 while using as little electrical power as possible. Each cooling machine controller 504 may thus be connected to the respective cooling machine 510 as well, as is indicated in FIG. 3.

Further, in FIG. 3, one cooling machine controller 504 is shown for each cooling machine assembly 500. However, the cooling machine controllers 504 may be formed by a single unit being configured to control the entire heat depositing system 200. The respective cooling machine controller 504 may thus be connected to the cooling circuit regulator 208 as well.

Figure 4:
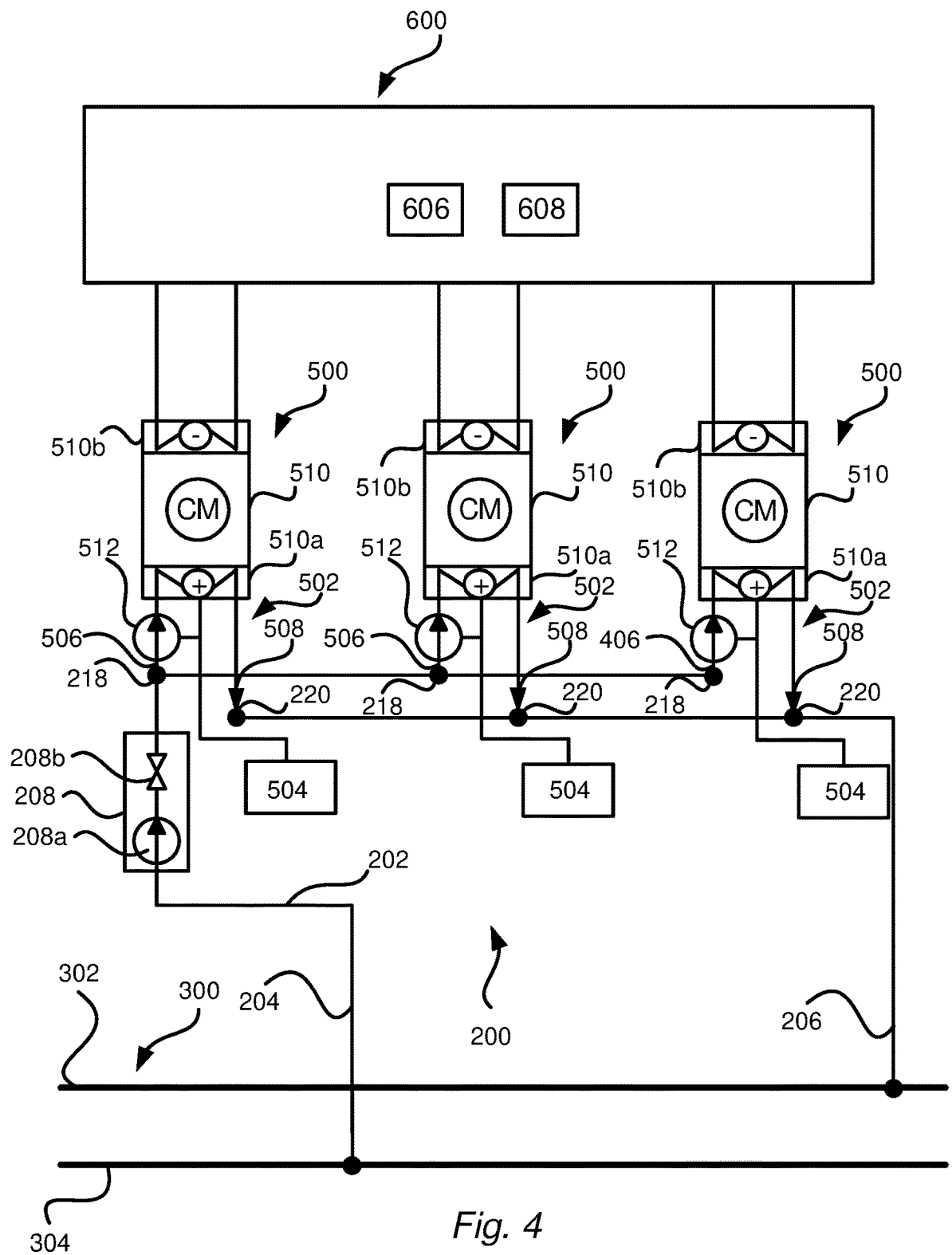
FIG. 4 discloses a schematic flow chart of a heat depositing system according to the present invention.

The plurality of cooling machine assemblies 500 may be connected to the cooling machine circuit 202 such that the first connection point 218 of each respective cooling machine assembly 500 is arranged one after the other in a downstream direction on the cooling machine circuit 202. Further still, the plurality of cooling machine assemblies 500 may be connected to the cooling machine circuit 202 such that the second connection point 220 of each respective cooling machine assembly 500 is arranged one after the other in a downstream direction on the cooling machine circuit 202. The first and second connection points 218, 220 do not necessarily have to connect to the same conduit on the cooling circuit 202, as is illustrated in the embodiment in FIG. 4. The embodiment of the heat depositing system 200 in FIG. 4 is identical to that of FIG. 3 apart from that the first connection points 218 and the second connection points 220 are connected to separated conduits on the cooling circuit 202. Having the first connection points 218 arranged on one conduit and the second connection points 220 on another conduit facilitates providing each cooling machine assembly 500 with thermal fluid having more or less the exact same temperature. This may facilitate control of the respective cooling machine assemblies 500 with a downside of having to use a separate conduit for the provision of thermal fluid and a separate conduit for the return of thermal fluid, which adds to the complexity of the heat depositing system 200.

The preferred embodiment shown in FIG. 3 shows how the first connection point 218 of a subsequent cooling machine assembly 500 may be connected to the cooling machine circuit 202 downstream of the second connection point 220 of a preceding cooling machine assembly 500. This arrangement is facilitated by the individual control of each cooling machine control pump 512 which allows adaptation of the eventual effect the aforementioned arrangement may have on the temperature of the thermal fluid as it passes each cooling machine assembly 500. Further still, as shown in FIG. 3, each cooling machine circuit 502 and the thermal cooling circuit 202 may partially overlap. The overlap is between the first 218 and second 220 connection points. Each cooling machine assembly 500 may thus circulate thermal fluid at a rate that is above or below that of the thermal cooling circuit 202.

The cooling machine control pump 512 provided in each cooling machine assembly 512 further allows omission of valves that are typically used to control the flow of thermal fluid in prior art system. Such prior art systems generally suffers from relatively high losses due to the restriction formed by each of the valves as they control the flow. This can be avoided by the provision of individual cooling machine control pumps 512. Moreover, the cooling machine control pumps 512 are capable of providing circulation of thermal fluid even if the cooling circuit regulator 208 for some reason fails, even in the thermal cooling circuit 202 to some degree. This provides a degree of redundancy and an increase in the robustness of the heat depositing system 200 of the present disclosure.

Figure 5:
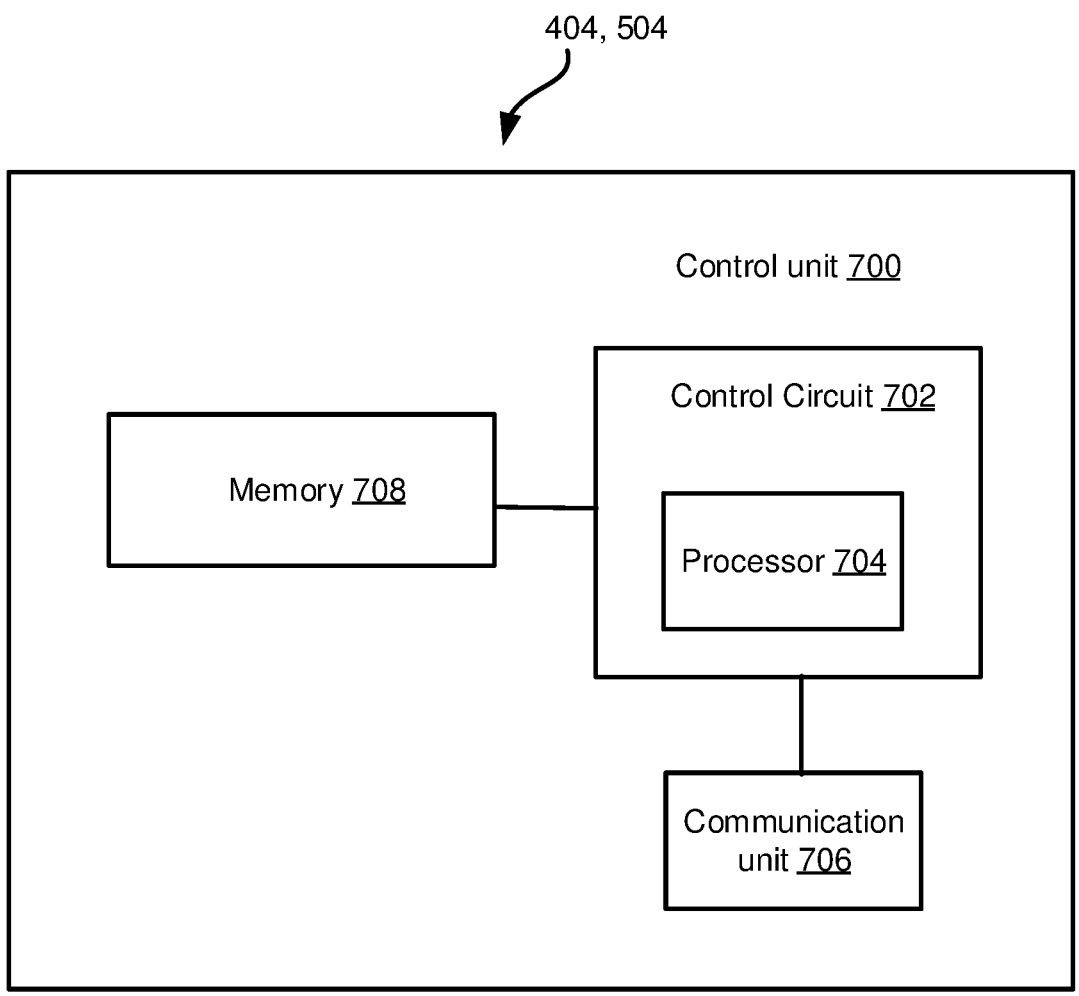
FIG. 5 discloses a schematic drawing of a controller according to one embodiment.

The respective controller 404, 504 of the heat extracting system 100 and the heat depositing system 200 respectively will be described below with reference to FIG. 5. Each controller 404, 504 may be formed by a single unit as mentioned, and is configured to carry out overall control of functions and operations of the heat extracting assembly 100 and of the heat depositing assembly 200 respectively and more specifically of each heat pump assembly 400 and each cooling machine assembly 500 respectively, and thus comprises a control unit 700 which may be associated with a memory 708. The control unit 700 may include a control circuit 702 and an associated processor 704, such as a central processing unit (CPU), microcontroller, or microprocessor. The processor 704 is configured to execute program code stored in the memory 708, in order to carry out functions and operations of the controller 404, 504.

The memory 708 may be one or more of a buffer, a flash memory, a hard drive, a removable media, a volatile memory, a non-volatile memory, a random access memory (RAM), or another suitable device. In a typical arrangement, the memory 708 may include a non-volatile memory for long term data storage and a volatile memory that functions as system memory for the control unit 700. The memory 708 may exchange data with the control unit 700 over a data bus. Accompanying control lines and an address bus between the memory 708 and the control unit 700 also may be present.

The control unit 700 may further comprise a communication unit 706, connected to the control circuit 702, configured to allow remote control of units of the respective system 100, 200. A unit of a system may be a heat pump control pump 412/a cooling machine control pump 512, a cooling machine 510, a heat pump 410, a flow regulator 108, 208, etc. The communication path over which the communication is made may be wired or wireless. The communication may include data transfers, and the like. Data transfers may include, but are not limited to, downloading and/or uploading data and receiving or sending messages. The data may be processed by the control unit 700. The processing may include storing the data in a memory, e.g. the memory 708 of the control unit 700, executing operations or functions, and so forth. The communication may be individual for each units of the respective assembly.

Functions and operations of the control unit 700 may be embodied in the form of executable logic routines (e.g., lines of code, software programs, etc.) that are stored on a non-transitory computer readable medium (e.g., the memory 708) of the control unit 500 and are executed by the control circuit 702 (e.g., using the processor 704). Furthermore, the functions and operations of the control unit 700 may be a stand-alone software application or form a part of a software application that carries out additional tasks related to the control unit 700. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The person skilled in the art realizes that the present invention by no means is limited to the preferred embodiments described above. On the contrary, many modifications and variations are possible within the scope of the appended claims.

For example, the heat pump demand signal and/or the cooling machine demand signal may comprise an extremal signal received from a central thermal energy manager. The central thermal energy manager being configured to manage thermal energy outtake (outtake of heat and/or cold) from the thermal energy circuit 300.

Additionally, variations to the disclosed embodiments can be understood and effected by the skilled person in practicing the claimed invention, from a study of the drawings, the disclosure, and the appended claims.

The invention claimed is:

1. A heat extracting system arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature, the heat extracting system comprising: a thermal heating circuit comprising a thermal heating circuit inlet connectable to the hot conduit and a thermal heating circuit outlet connectable to the cold conduit, the thermal heating circuit is configured to transfer the thermal fluid from the thermal heating circuit inlet to the thermal heating circuit outlet, the thermal heating circuit further comprises a thermal heating circuit flow regulator configured to regulate the flow of the thermal fluid from the thermal heating circuit inlet to the thermal heating circuit outlet based on one or more of a desired temperature of the thermal fluid in the thermal heating circuit outlet, a desired pressure difference of the thermal fluid in the thermal heating circuit inlet and the thermal heating circuit outlet and a desired temperature difference of the thermal fluid in the thermal heating circuit inlet and the thermal heating circuit outlet, and a plurality of heat pump assemblies each comprising a heat pump, a heat pump circuit and a heat pump assembly controller, the heat pump being connected to the heat pump circuit, each of the heat pump circuit comprising a heat pump circuit inlet connected to the thermal heating circuit at a first connection point, a heat pump circuit outlet connected to the thermal heating circuit at a second connection point and a heat pump control pump configured to control a flow of the thermal fluid from the heat pump circuit inlet through the heat pump at a heat extraction side thereof to the heat pump circuit outlet, wherein the heat pump assembly controller is configured to control a flow rate of each of the heat pump control pump based on a heat pump demand signal indicative of one or more of a thermal load placed on the heat pump and an efficiency of the heat pump.

2. The heat extracting system according to claim 1, wherein the plurality of heat pump assemblies are connected to the heat pump circuit such that the first connection point of each respective heat pump assembly is arranged one after the other in a downstream direction on the heat pump circuit.

3. The heat extracting system according to claim 1, wherein the plurality of heat pump assemblies are connected to the heat pump circuit such that the second connection point of each respective heat pump assembly is arranged one after the other in a downstream direction on the heat pump circuit.

4. The heat extracting system according to claim 1, wherein the first connection point of a subsequent heat pump assembly is connected to the heat pump circuit downstream of the second connection point of a preceding heat pump assembly.

5. The heat extracting system according to claim 1, wherein, for at least one of the plurality of heat pump assemblies, the heat pump circuit and the thermal heating circuit partially overlap, wherein the overlap is between the first and second connection points.

6. The heat extracting system according to claim 1, wherein at least one of the plurality of heat pumps is configured to provide tap hot water, the heat pump demand signal for such a heat pump being a demand signal for tap hot water.

7. The heat extracting system according to claim 1, wherein at least one of the plurality of heat pumps is configured to provide comfort heating, the heat pump demand signal for such a heat pump being a demand signal for comfort heating.

8. A heat depositing system arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature, the heat depositing system comprising: a thermal cooling circuit comprising a thermal cooling circuit inlet connectable to the cold conduit and a thermal cooling circuit outlet connectable to the hot conduit, the thermal cooling circuit is configured to transfer the thermal fluid from the thermal cooling circuit inlet to the thermal cooling circuit outlet, the thermal cooling circuit further comprises a thermal cooling circuit flow regulator configured to regulate the flow of the thermal fluid from the thermal cooling circuit inlet to the thermal circuit outlet based on one or more of a desired temperature of the thermal fluid in the thermal cooling circuit outlet, a desired pressure difference of the thermal fluid in the thermal cooling circuit inlet and the thermal cooling circuit outlet and a desired temperature difference of the thermal fluid in the thermal cooling circuit inlet and the thermal cooling circuit outlet, and a plurality of cooling machine assemblies each comprising a cooling machine, a cooling machine circuit and a cooling machine assembly controller, the cooling machine being connected to the cooling machine circuit, each cooling machine circuit comprising a cooling machine circuit inlet connected to the thermal cooling circuit at a first connection point, a cooling machine circuit outlet connected to the thermal cooling circuit at a second connection point and a cooling machine control pump configured to control a flow of the thermal fluid from the cooling machine circuit inlet through the cooling machine at a heat depositing side thereof to the cooling machine circuit outlet, wherein the cooling machine assembly controller is configured to control a flow rate of each cooling machine control pump based on a cooling machine demand signal indicative of one or more of a thermal load placed on the cooling machine and an efficiency of the cooling machine.

9. The heat depositing system according to claim 8, wherein the plurality of cooling machine assemblies are connected to the cooling machine circuit such that the first connection point of each respective cooling machine assembly is arranged one after the other in a downstream direction on the cooling machine circuit.

10. The heat depositing system according to claim 8, wherein the plurality of cooling machine assemblies are connected to the cooling machine circuit such that the second connection point of each respective cooling machine assembly is arranged one after the other in a downstream direction on the cooling machine circuit.

11. The heat depositing system according to claim 8, wherein the first connection point of a subsequent cooling machine assembly is connected to the cooling machine circuit downstream of the second connection point of a preceding cooling machine assembly.

12. The heat depositing system according to claim 8, wherein, for at least one of the plurality of cooling machine assemblies, the cooling machine circuit and the thermal cooling circuit partially overlap, wherein the overlap is between the first and second connection points.

13. The heat depositing system according to claim 8, wherein at least one of the plurality of cooling machines is configured to provide comfort cooling, the cooling machine demand signal for such a cooling machine being a demand signal for comfort cooling.

* * * * *